(12) United States Patent
Sipe

(10) Patent No.: US 8,655,014 B2
(45) Date of Patent: Feb. 18, 2014

(54) SYSTEM AND METHOD FOR AUTOMATED ADDRESS DIRECTORY UPDATING

(71) Applicant: Stanley W. Sipe, North Richland Hills, TX (US)

(72) Inventor: Stanley W. Sipe, North Richland Hills, TX (US)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 13/855,325

(22) Filed: Apr. 2, 2013

(65) Prior Publication Data

US 2013/0216091 A1 Aug. 22, 2013

Related U.S. Application Data

(63) Continuation of application No. 12/850,778, filed on Aug. 5, 2010, now Pat. No. 8,433,093.

(60) Provisional application No. 61/231,463, filed on Aug. 5, 2009.

(51) Int. Cl.
*G06K 9/00* (2006.01)
*G06F 7/00* (2006.01)

(52) U.S. Cl.
USPC .......................... 382/101; 382/321; 700/227

(58) Field of Classification Search
USPC ............... 382/100–103, 106–108, 112–114, 382/135–140, 155, 168, 173, 181–189, 200, 382/206, 209, 219, 224, 232, 254, 278–295, 382/305, 312, 321; 209/580; 702/108; 705/1.1; 700/227
See application file for complete search history.

(56) References Cited

U.S. PATENT DOCUMENTS

| | | | | |
|---|---|---|---|---|
| 4,082,188 | A * | 4/1978 | Grimmell et al. | 209/580 |
| 6,954,729 | B2 * | 10/2005 | Lee et al. | 705/1.1 |
| 7,792,683 | B2 * | 9/2010 | Sipe et al. | 705/1.1 |
| 7,996,173 | B2 * | 8/2011 | Schowengerdt et al. | 702/108 |
| 8,150,547 | B2 * | 4/2012 | Wojdyla et al. | 700/227 |

* cited by examiner

*Primary Examiner* — Seyed Azarian

(57) ABSTRACT

A system and method for automated address directory updating. A method includes determining address information corresponding to a destination address for a parcel, the address information including a digitized address. The method includes determining if a previous address entry proposal, corresponding to the address information and having a counter, exists in a database. The method includes, if the previous address entry proposal does not exist, then storing the address information in a new address entry proposal and initializing a counter for the new address entry proposal. The method includes, if the previous address entry proposal does exist, then adjusting the counter for the previous address entry proposal. The method includes adding the address information to a first addressing database when the counter has reached a threshold.

20 Claims, 3 Drawing Sheets

SYSTEM AND METHOD FOR AUTOMATED ADDRESS DIRECTORY UPDATING

CROSS-REFERENCE TO OTHER APPLICATION

This application is a continuation of U.S. patent application Ser. No. 12/850,778, filed Aug. 5, 2010, now U.S. Pat. No. 8,433,093, and claims the benefit of the filing date of U.S. Provisional Patent Application 61/231,463, filed Aug. 5, 2009, both of which are hereby incorporated by reference.

TECHNICAL FIELD

The present disclosure is directed, in general, to automated address directory updating during parcel processing.

BACKGROUND OF THE DISCLOSURE

Conventional manual updating of address directories is inefficient, and improved methods are desirable.

SUMMARY OF THE DISCLOSURE

Various disclosed embodiments include a system and method for automated address directory updating. A method includes determining address information corresponding to a destination address for a parcel, the address information including a digitized address. The method includes determining if a previous address entry proposal, corresponding to the address information and having a counter, exists in a database. The method includes, if the previous address entry proposal does not exist, then storing the address information in a new address entry proposal and initializing a counter for the new address entry proposal. The method includes, if the previous address entry proposal does exist, then adjusting the counter for the previous address entry proposal. The method includes adding the address information to a first addressing database when the counter has reached a threshold.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
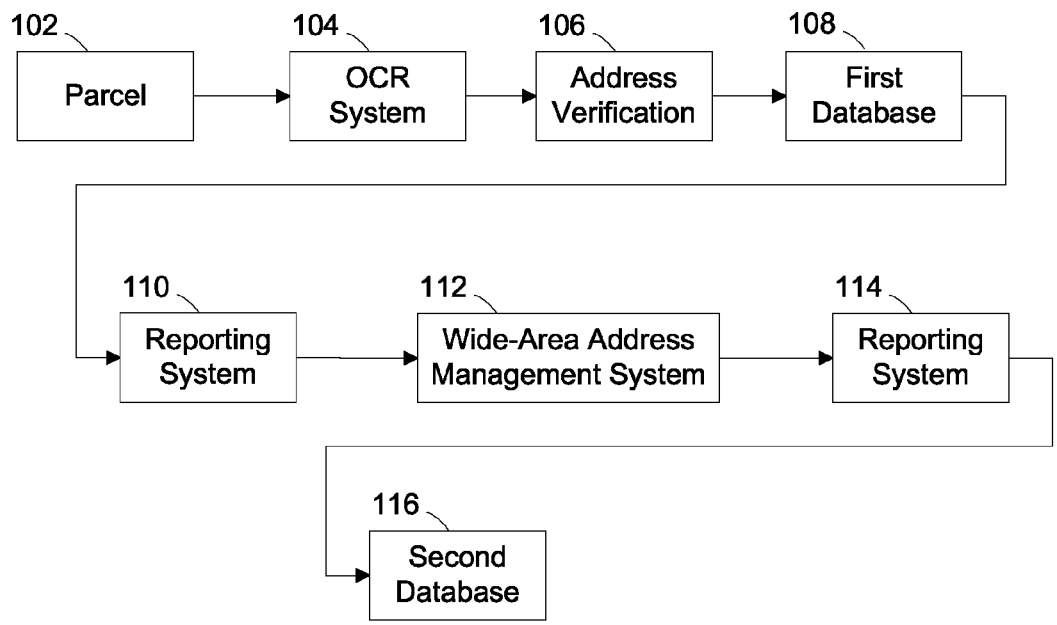
FIG. 1 shows a simplified block diagram of a parcel address updating workflow in accordance with disclosed embodiments.
Figure 2:
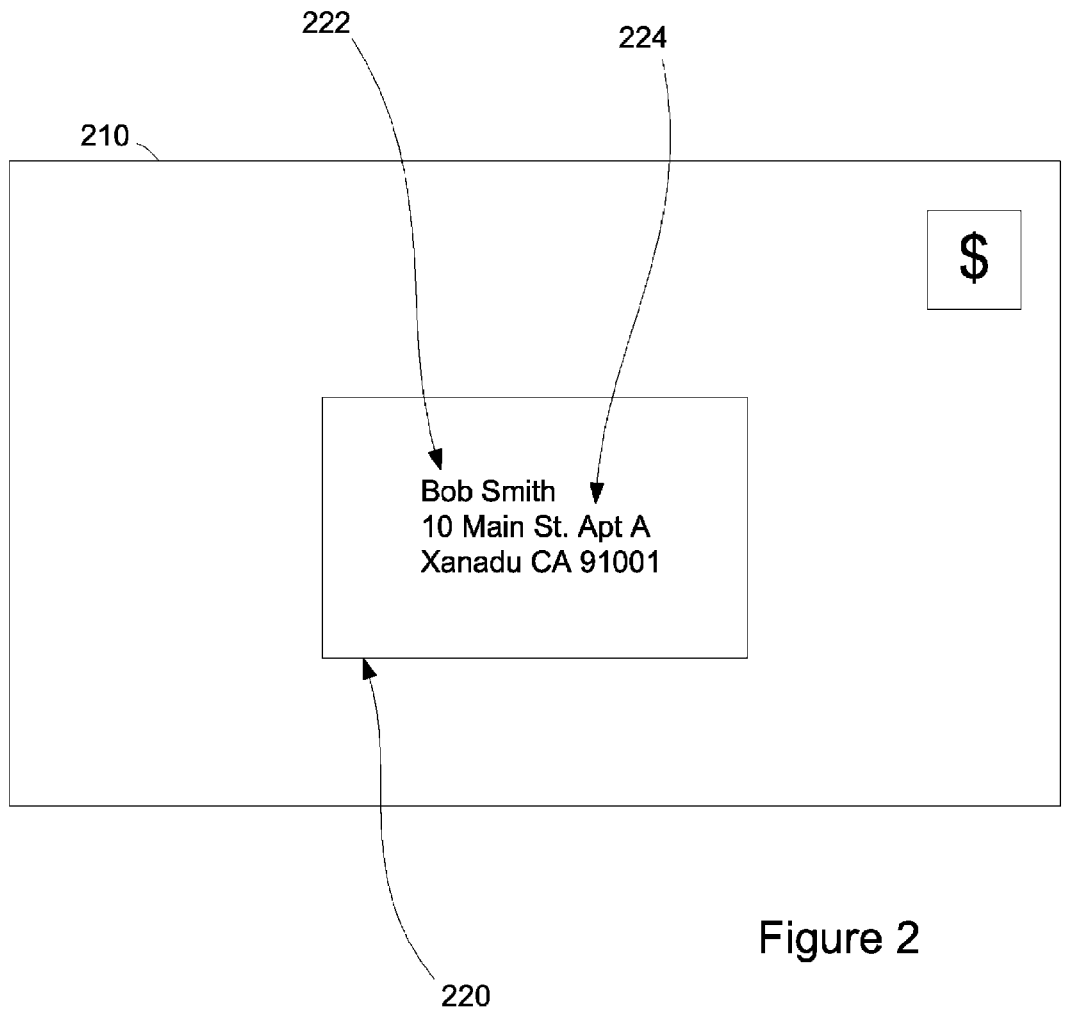
FIG. 2 depicts a parcel in accordance with a disclosed embodiment.
Figure 3:
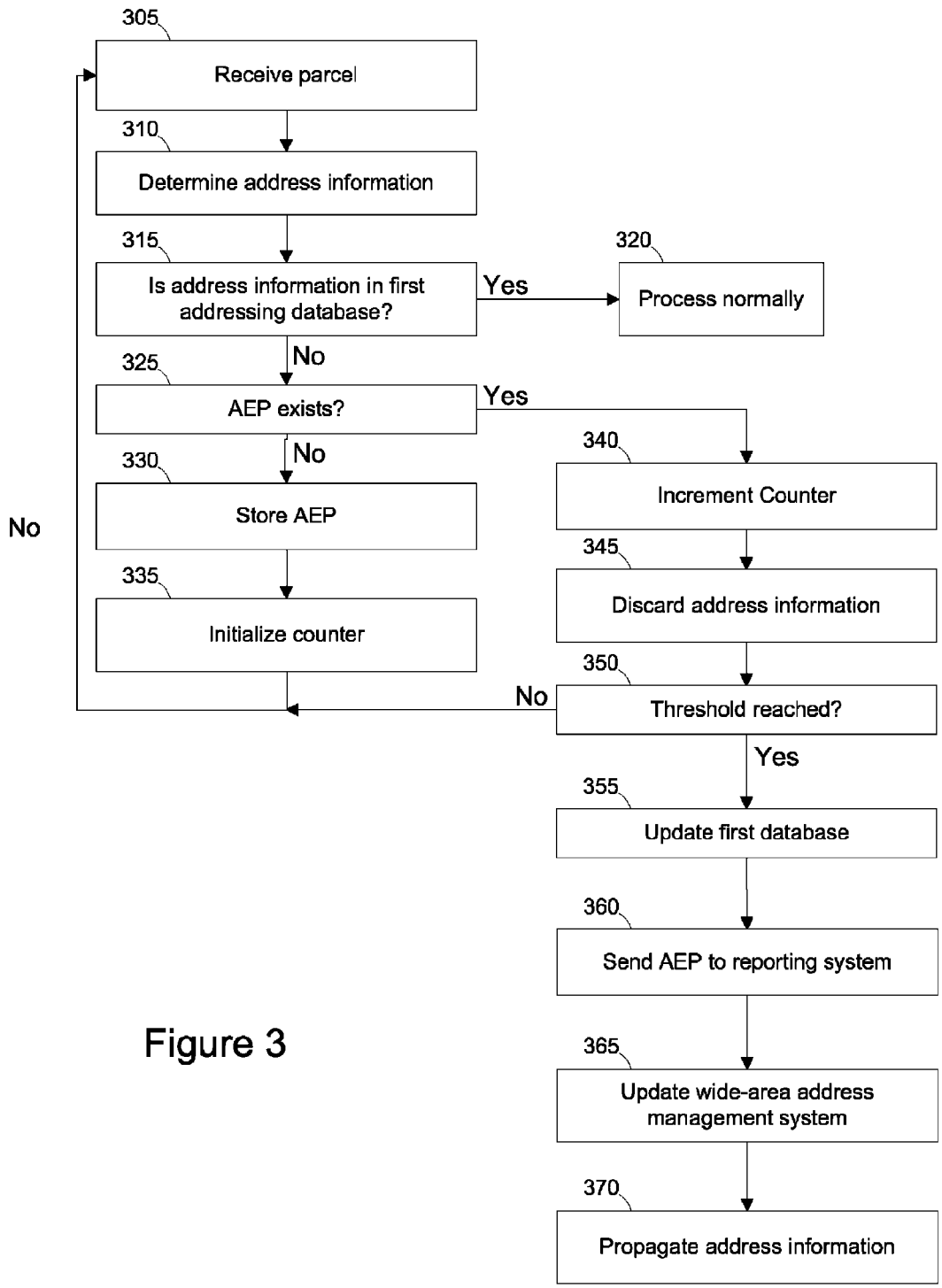
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The United States Postal Service (USPS) currently uses a highly manual process for the maintenance of its Address Management Systems Database (AMS). The AMS database is maintained by USPS national customer support center (NCSC) by gathering various forms of inputs, such as address adds, changes, and deletes, from its delivery unit (DU) operations as well as public information such as the creation of new residential housing and firms.

The USPS Delivery Sortation Management Automation Research Tool (DSMART) identifies addresses that receive mail but are not in the AMS database and cannot be sorted into delivery point sequence (DPS). DMART can help increase the accuracy of the firm names and locations within the AMS database. This is a manual process involving DU personnel input and transmission of updates through email to NCSC for collection and review.

Disclosed embodiments include a system and method for automated recognition of corrections and updates (individually and collectively, "updates") to a delivery address database including propagation of updates to other units. While the specific embodiment disclosed herein references USPS processes and systems, those of skill in the art will recognize that, unless specifically limited, the appended claims apply to processes and systems of any public or private courier. "Parcel", as used herein, refers to postal mail and packages, whether processed by governmental, semi-governmental, or private entities, including but not limited to the United States Postal Service, other national postal services, and commercial parcel delivery and courier services, referred to herein as the "courier".

U.S. Pat. Appn. No. 20090089236 describes a process for identifying information placed on a good to be processed, such as address information on a mailpiece, by using speech recognition techniques, and is incorporated by reference. U.S. Pat. No. 6,996,525 describes a method to use a recognizer's properties and performance measured in statistical terms to select a candidate from among several alternatives presented by independent speech recognizers, and is incorporated by reference. U.S. Pat. No. 7,145,093 describes a method and system for image processing that includes recognizing and processing written information on a package, and is incorporated by reference. U.S. Pat. No. 7,436,979 describes a method and system for image processing that includes scanning and processing of images and sub-images of mail pieces to decode address and other information, and is incorporated by reference. U.S. Pat. Appn. No. 20040093222 describes method and system for address information distribution, and is incorporated by reference. The address recognition and identification processes described herein can be implemented using any of these methods, for example.

FIG. 1 depicts a simplified block diagram of a parcel address updating workflow.

A parcel 102 is received at a parcel optical character recognition (OCR) system 104. For example, a letter may be picked up from a residence and delivered by a mail carrier to a USPS Delivery Bar Code Sorter Input/Output SubSystem (DIOSS), a sorting station, or other system that functions as the parcel OCR system 104. The parcel OCR system performs an OCR process to determine address information for the parcel, and the address information can include one or both of an image of the parcel address and the digitized address information obtained from the OCR process.

Note that the remainder of the description below does not necessarily include the transfer and delivery of the parcel itself, which may be concurrent with and/or independent of the management of the address information as discussed below.

The address information is sent to, received by, and verified by an address verification system 106. The address verification system 106 can be implemented, for example, in a USPS Change-of-Address Record Server (CARS), and can determine if the address information corresponds to a current or changed address. In a specific example, a DIOSS can generate the digitized address information as an OCR result from the address information, then query the CARS to receive a hit/miss answer corresponding to whether the digitized address information is found in a first database system 108. This verification process can include comparing the address information against a USPS "ZIP+4" database and/or a postal change-of-address (PCOA) database connected to or a part of first database system 108. The address verification system 106 can also format the digitized address information as part of the verification process for consistent, standardized comparisons and updates. The address verification system 106 and first database system 108 can together implement a local address management system.

The local address management system includes a database of names, addresses, and other information, and uses this information to attempt to correct the address information. In particular, the first addressing database system 108 can compare the parcel address information to the stored data, and identifies any specific new data. A successful lookup or "hit" is obtained when the address information matches the stored data, and an unsuccessful lookup or "miss" is obtained when the address information is different from the stored data. This comparison can be based on any part of the address information, including the ZIP+4 data and PCOA data.

For example, the address information may be addressed to "Bob Smith" at "10 Main St. Apt. A". If this data is found in the first addressing database, a hit is returned. If this data is not found in the first addressing database, a miss is returned. The local address management system inserts any "miss" address information in the first addressing database system 108 as an address entry proposal (AEP), and/or increases a counter for that address information. For example, if "Bob Smith" is not found in the first addressing database as associated with the address "10 Main St. Apt. A", the first distribution system 106 inserts this information in the first addressing database system 108 as an AEP if it is the first time it has been encountered, or increases a counter for that information if it has been received to reflect the number of times that address information has been received.

The local address management system can store the address information including both the image of the parcel address and the digitized address information, or both. In some embodiments, a single image of the parcel address is stored regardless of the number of times the same address information is received and the counter incremented. In these cases, the amount of data needed to be stored and transferred is reduced by only requiring one image of the parcel address to be stored as opposed to storing each different image corresponding to the same digitized address information. In some cases, each time a new parcel address image is received, the new parcel address image is compared to the stored parcel address image, and the system determines which image is of better quality in terms of such factors as clarity, contrast, and OCR reliability. In these cases, the better quality parcel address image is stored, and the lesser-quality parcel address image is discarded. Of course, other images may be stored temporarily for processing, comparison, and other reasons, but various embodiments anticipate that only a single image corresponding to a particular address information is stored persistently with the AEP and transmitted with the AEP as described below.

Once the counter for specific address information has passed a threshold, for example 25, the address information, as the AEP, can be automatically inserted in the first addressing database system 108 as an update, and used by the local CARS and/or PCOA system.

The AEP and image data can then be transmitted to and received by a reporting system 110, and can optionally be reviewed by a user at the local level, typically by comparing the digitized address information in the AEP to the parcel address image to determine if it is correct.

The AEP and image data can then be transmitted to and received by a wide-area address management system 112, and can optionally again be reviewed by a user at a higher level, typically by comparing the digitized address information in the AEP to the parcel address image to determine if it is correct. The wide-area address management system 112 can be, for example, a USPS Address Management System (AMS). The address information may be transmitted in its original form, or may have been reformatted by the first addressing database system 108. The address information can then be stored in the wide-area address management system 112. By way of specific example, this step can include review and insertion of the address information into the USPS AMS system in Memphis, Tenn.

At this time, the parcel address image can be discarded, if it has been maintained and stored with the address information. In certain embodiments, by only storing and transmitting a single parcel address image corresponding to any specific address, and discarding the parcel address image as soon as it is no longer needed for update verification purposes, storage and transmission requirements are minimized.

The address information is then included in an address database update to other addressing database systems, including at least a second addressing database system 116, optionally being distributed by a data distribution center 114 such as the USPS Postal Data Distribution Center in San Mateo, Calif. For example, a USPS AMS system can "refresh" the local AEP systems with the updated data that includes the new address information, directly or through the USPS data distribution center. In a typical implementation, the address database update can be sent from the USPS AMS to the USPS Postal Data Distribution Center, and can be distributed from there to the local AEPs nationwide.

At that time, each local address management system will see that address information as a "hit" since the databases have been automatically updated. While manual user review of the address information can be performed at various times, the system can perform the entire process automatically without any user review or intervention, providing distinct technical advantages over known systems.

FIG. 2 depicts a parcel in accordance with a disclosed embodiment. In this case, the parcel is a letter 210 with address label 220. After the OCR process described herein, the address information can include the digitized information and an image of address label 220.

The address information shows the name 222 as "Bob Smith" and the street address 224 that includes "10 Main St. Apt A". In the example above, assuming that "Bob Smith" in "10 Main St. Apt A" is a "miss" as not being in the local addressing database, the process counts the number of times a parcel is identified addressed to "Bob Smith" in "10 Main St. Apt A". After this number of times reaches or passes a threshold value such as 25, the process will automatically send this address information for inclusion in the master addressing database, and it will be automatically propagated from there to the other local addressing databases. As described above, at any point there can optionally be a manual review of the address information against the image to be sure it is correct, such as before the master addressing database is updated or before the addressing information is propagated to the other local addressing databases.

FIG. 3 depicts a flowchart of a process in accordance with disclosed embodiments. The process can be performed by a plurality of hardware systems, configured to act together to perform the steps described herein, and these hardware systems can include those described above.

A parcel having a destination address is received at an OCR system (step 305), such as a United States Postal Service mail scanning system.

The system performs an OCR process on the destination address to determine machine-readable address information (step 310). Where the destination address is typically a printed label, the machine-readable address information can include a digitized address and an image of the destination address; "address" as used herein can also include the name of the recipient individual, business, or otherwise. A voice-recognition processes or hybrid voice process can be used in addition to or instead of the OCR process. This step can be performed by a USPS DIOSS system or by any configured processing system having at least a processor and accessible storage.

The system determines if the address information is found in a first addressing database (step 315). This can include performing a lookup in a local USPS AEP system, and can be performed using a USPS ZIP+4 database, a USPS postal change of address database, or by any configured data processing system having at least a processor and accessible storage.

If the address information is found, the parcel and address information is processed in a standard manner, not described in this document (step 320).

If the address information is not found, the system determines if a previous address entry proposal for the address information already exists (step 325). If it does not exist, the system stores the address information, including the digitized address and image of the destination address, as a new address entry proposal (AEP) (step 330). In some embodiments, this storing the system only stores one image of that destination address as an AEP at any time.

The system initializes a counter to indicate the number of times this address information has been encountered as a miss (step 335). The process repeats at step 305, awaiting another parcel with the same address information.

If an address entry proposal for the address information already exists as a previous AEP (at step 325), the system increments the counter for that AEP (step 340). Of course, while this example uses an incrementing counter, other similar techniques could be used, such as counting down a counter from a threshold value.

The new address information, including the digitized address and image of the destination address, can be discarded at this point (step 345). In some embodiments, this includes comparing the current image of the destination address with the stored image of the destination address to determine which image is of better quality in terms of such factors as clarity, contrast, and OCR reliability, discarding the lesser-quality image, and storing the better-quality image in the AEP.

The system determines if the counter has reached a threshold value (step 350), such as 25. If not, the process repeats at step 305, awaiting another parcel with the same address information.

If the counter has reached the threshold value (at step 350), the system updates the first addressing database to include the address information from the AEP (step 355).

The AEP is sent to a reporting system (step 360), such as a local AEP review system. This step can include receiving a user verification input according to the digitized address and image of the destination address.

The system updates a wide-area address management system to include the address information (step 365). This step can include or be dependent on receiving a user verification of the update according to such aspects as the address information and the image. Updating the master addressing database can include sending any data form that includes information corresponding to the address information. In particular, this can include a batch update including multiple sets of updated address information or sending an entire database. The wide-area address management system can be implemented in a United States Postal Service address management system (AMS). This step can include discarding the AEP, including the address information and AEP, whether it is discrete data or part of a batch update or entire database, after the update of the wide-area address management system has been completed.

The system propagates the address information to a plurality of other local addressing databases to update the other local addressing databases with the address information (step 370). Updating the other local addressing databases can include sending any data form that includes information corresponding to the address information. In particular, this can include a batch update including multiple sets of updated address information or sending an entire database. Typically, this propagation is performed from the master addressing database to the other local addressing databases, but can in other embodiments be performed from the first addressing database to the other local addressing databases. In various embodiments, the address information includes an updated address that is automatically propagated to the plurality of local addressing databases after the counter reaches the threshold. In some cases, this step can be performed using a USPS distribution system such as the USPS postal data distribution center in San Mateo, Calif.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for automated address directory updating performed by at least one hardware system, comprising:
   determining address information corresponding to a destination address for a parcel, the address information including a digitized address;
   determining if a previous address entry proposal, corresponding to the address information and having a counter, exists in a database;
   if the previous address entry proposal does not exist, then storing the address information in a new address entry proposal and initializing a counter for the new address entry proposal;
   if the previous address entry proposal does exist, then adjusting the counter for the previous address entry proposal; and
   when the counter has reached a threshold, then adding the address information to a first addressing database.

2. The method of claim 1, wherein if the previous address entry proposal does exist, then also discarding the address information.

3. The method of claim 1, wherein the system also receives an address image corresponding to the destination address for the parcel, determines a better-quality address image from the address image corresponding to the destination address and a stored address image corresponding to the destination address, and stores the better-quality address image in the address entry proposal.

4. The method of claim 3, wherein determining a better-quality address image is performed according to at least one of the clarity, contrast, and OCR reliability of the address images.

5. The method of claim 1, wherein the system also propagates the address information to a plurality of second addressing databases after the address information is added to the first addressing database.

6. The method of claim 1, wherein determining address information corresponding to a destination address for a parcel includes receiving the address information generated by an optical character recognition system.

7. The method of claim 1, wherein the system also reformats the address information.

8. The method of claim 1, wherein adding the address information to the first addressing database includes receiving a user verification of the address information.

9. The method of claim 1, wherein the system also discards the address entry proposal after receiving a user verification of the address information.

10. The method of claim 1, wherein adjusting the counter includes incrementing the counter.

11. A system for automated address directory updating, comprising at least one hardware system configured to:
    determine address information corresponding to a destination address for a parcel, the address information including a digitized address;
    determine if a previous address entry proposal, corresponding to the address information and having a counter, exists in a database;
    if the previous address entry proposal does not exist, then store the address information in a new address entry proposal and initialize a counter for the new address entry proposal;
    if the previous address entry proposal does exist, then adjust the counter for the previous address entry proposal; and
    when the counter has reached a threshold, then add the address information to a first addressing database.

12. The system of claim 11, wherein if the previous address entry proposal does exist, then the system also discards the address information.

13. The system of claim 11, wherein the system also receives an address image corresponding to the destination address for the parcel, determines a better-quality address image from the address image corresponding to the destination address and a stored address image corresponding to the destination address, and stores the better-quality address image in the address entry proposal.

14. The system of claim 13, wherein determining a better-quality address image is performed according to at least one of the clarity, contrast, and OCR reliability of the address images.

15. The system of claim 11, wherein the system also propagates the address information to a plurality of second addressing databases after the address information is added to the first addressing database.

16. The system of claim 11, wherein determining address information corresponding to a destination address for a parcel includes receiving the address information generated by an optical character recognition system.

17. The system of claim 11, wherein the system also reformats the address information.

18. The system of claim 11, wherein adding the address information to the first addressing database includes receiving a user verification of the address information.

19. The system of claim 11, wherein the system also discards the address entry proposal after receiving a user verification of the address information.

20. The system of claim 11, wherein adjusting the counter includes incrementing the counter.

\* \* \* \* \*